United States Patent
Akita et al.

(10) Patent No.: US 6,465,120 B1
(45) Date of Patent: Oct. 15, 2002

(54) COMPOSITE POLYMER MEMBRANE, METHOD FOR PRODUCING THE SAME AND SOLID POLYMER ELECTROLYTE MEMBRANE

(75) Inventors: Hiroshi Akita; Masao Ichikawa; Masaru Iguchi; Hiroyuki Oyanagi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/664,087

(22) Filed: Sep. 18, 2000

(30) Foreign Application Priority Data

Sep. 20, 1999 (JP) .......................................... 11-265114

(51) Int. Cl.$^7$ ................................................ H01M 8/10
(52) U.S. Cl. ........................................ 429/33; 429/30
(58) Field of Search ...................................... 429/30, 33

(56) References Cited

U.S. PATENT DOCUMENTS

| | | | |
|---|---|---|---|
| 4,472,488 A | 9/1984 | Maxfield et al. | 429/213 |
| 4,563,263 A | 1/1986 | Oyama et al. | 204/418 |
| 5,137,991 A * | 8/1992 | Epstein et al. | 252/500 |
| 5,618,469 A | 4/1997 | Harlev et al. | 252/500 |
| 5,626,795 A | 5/1997 | Smith et al. | 252/500 |
| 5,853,794 A | 12/1998 | Melody et al. | 427/58 |
| 5,919,401 A | 7/1999 | Melody et al. | 252/500 |
| 5,981,695 A | 11/1999 | Mattes et al. | 528/492 |
| 6,099,907 A | 8/2000 | Mattes et al. | 427/336 |

FOREIGN PATENT DOCUMENTS

EP          0 654 804 A2    5/1995

OTHER PUBLICATIONS

Li, N. et al., "A Polyaniline and Nafion Composite Film as a Rechargeable Battery," J. App. Electrochem. 22 512–516 (1992).*
G. Biden and B. Ehui, One-step Electrosynthesis and Characterization of Poly(aniline)–Nafion and Poly(3–methylthiophene)–Nafion Composite Films, pp. 1568–1570.
P. Adebert et al, New Chemical Synthesis of Mixed Conductivity Polymers, 1986, pp. 1636–1638.
M. Fabrizio et al, Polyaniline–based membranes for gas electrodes, Jan. 24, 1992, pp. 197–212.
N. Li et al, A polyaniline and Nafion® composite film as a rechargeable battery, 1992, pp. 512–516.

* cited by examiner

Primary Examiner—Carol Chaney
Assistant Examiner—Dah-Wei D. Yuan
(74) Attorney, Agent, or Firm—Lahive & Cockfield, LLP

(57) ABSTRACT

A solid polymer electrolyte membrane excellent in proton conductivity and methanol barrier property, which is composed of a composite membrane obtained by allowing aniline to be adsorbed by a perfluorosulfonic acid polymer membrane, and subjecting the aniline to oxidative polymerization to form a polyaniline-containing polymer membrane.

25 Claims, 1 Drawing Sheet

COMPOSITE POLYMER MEMBRANE, METHOD FOR PRODUCING THE SAME AND SOLID POLYMER ELECTROLYTE MEMBRANE

FIELD OF THE INVENTION

The present invention relates to a composite polymer membrane, a method for producing the same and a solid polymer electrolyte membrane.

BACKGROUND OF THE INVENTION

In recent years, fuel cells have occupied an important position as next generation type clean energy sources. Of these fuel cells, a solid polymer electrolyte type fuel cell is one in which both anode and cathode electrodes are each arranged across a solid polymer electrolyte membrane intervening therebetween. For example, in the case of a direct methanol type fuel cell (hereinafter referred to as a "DMFC") in which methanol is used as a fuel, methanol is supplied to the anode side, and oxygen or air to the cathode side, thereby allowing electrochemical reaction to occur to generate electricity. Solid polymer electrolyte membranes having high proton conductivity have been developed for retaining the characteristics of their high output and high energy density, and for obtaining small-sized, lightweight fuel cells. The solid polymer electrolyte membrane used in the DMFC is required to have the barrier property to fuel methanol, that is to say, reduced permeability (cross-over) of fuel methanol from the anode side of the membrane to the cathode side thereof.

Previously, hydrated membranes of perfluorosulfonic acid polymers such as Nafion (trade name) manufactured by E. I. du Pont de Nemours and Company) have generally been used as the solid polymer electrolyte membranes. The structure of Nafion is represented by the following general formula (I):

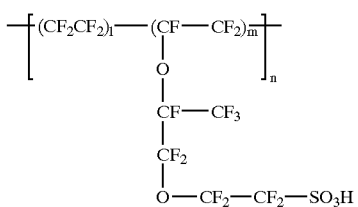

(I)

The above-mentioned hydrated membranes of perfluorosulfonic acid polymers have high proton conductivity, and the proton conductivity is exhibited by the generation of a channel structure caused by hydration (conduction of hydrated protons) That is to say, the conduction of protons takes place through water as a medium in the hydrated membranes of perfluorosulfonic acid polymers, so that a specified amount of water exists in the hydrated membranes. Accordingly, methanol having high affinity with water easily passes through the membranes, so that the hydrated membranes of perfluorosulfonic acid polymers have a limitation with regard to the methanol barrier property.

As means for reducing the cross-over of methanol through the hydrated membranes of perfluorosulfonic acid polymers, composites of different kinds of materials based on the hydrated membranes of perfluorosulfonic acid polymers may be mentioned. However, the above-mentioned composites have significantly lower proton conductivity than the essential one of the hydrated membranes of perfluorosulfonic acid polymers.

SUMMARY OF THE INVENTION

The present invention has been made against a background of the current problems of the hydrated membranes of perfluorosulfonic acid polymers as the solid polymer electrolyte materials as described above.

An object of the invention is to provide a composite polymer membrane.

Another object of the invention is to provide a method for producing the same.

A further object of the invention is to provide a solid polymer electrolyte membrane excellent in proton conductivity and methanol barrier property.

The present inventors have conducted intensive investigation for attaining the above-mentioned objects. As a result, the inventors have discovered that a solid polymer electrolyte membrane excellent in proton conductivity and methanol barrier property is obtained by allowing aniline to be adsorbed by an acidic group-containing polymer membrane, and subjecting aniline to oxidative polymerization to obtain a polyaniline-containing polymer membrane, thereby preparing a composite membrane, thus completing the invention.

The invention provides a composite polymer membrane in which a polyaniline-containing polymer membrane is formed on a surface of an acidic group-containing polymer membrane.

Aromatic rings in repeating units of the above-mentioned polyaniline may have substituents.

It is preferred that the above-mentioned acidic group-containing polymer is a sulfonic acid group-containing water-absorptive polymer.

The above-mentioned acidic group-containing polymer preferably has proton conductivity.

The above-mentioned acidic group-containing polymer is preferably a perfluorosulfonic acid polymer.

It is preferred that the above-mentioned composite membrane has proton conductivity by hydration.

Further, the invention provides a method for producing the above-mentioned composite membrane, which comprises allowing aniline to be adsorbed by an acidic group-containing polymer membrane, and subjecting the aniline to oxidative polymerization to obtain a polyaniline-containing polymer membrane.

In the above-mentioned method, it is preferred that the acidic group-containing polymer membrane is subjected to equilibration treatment in deionized water or an aqueous solution of an acid before the adsorption of aniline to allow an acid to be contained in the polymer membrane.

In the above-mentioned method, it is preferred that the thickness of the polyaniline-containing polymer membrane and the concentration of the polyaniline contained in the composite membrane are increased by increasing the concentration of the aqueous solution of the acid.

Still further, the invention provides a solid polymer electrolyte membrane comprising the above-mentioned composite membrane.

BRIEF DESCRIPTION OF THE DRAWING

These and other objects and advantages of this invention will become more apparent and more readily appreciated from the following detailed description of the presently preferred exemplary embodiments of the invention taken in conjunction with accompanying drawing, of which.

DESCRIPTION OF THE PREFERRED EMBODIMENTS

Figure 1:
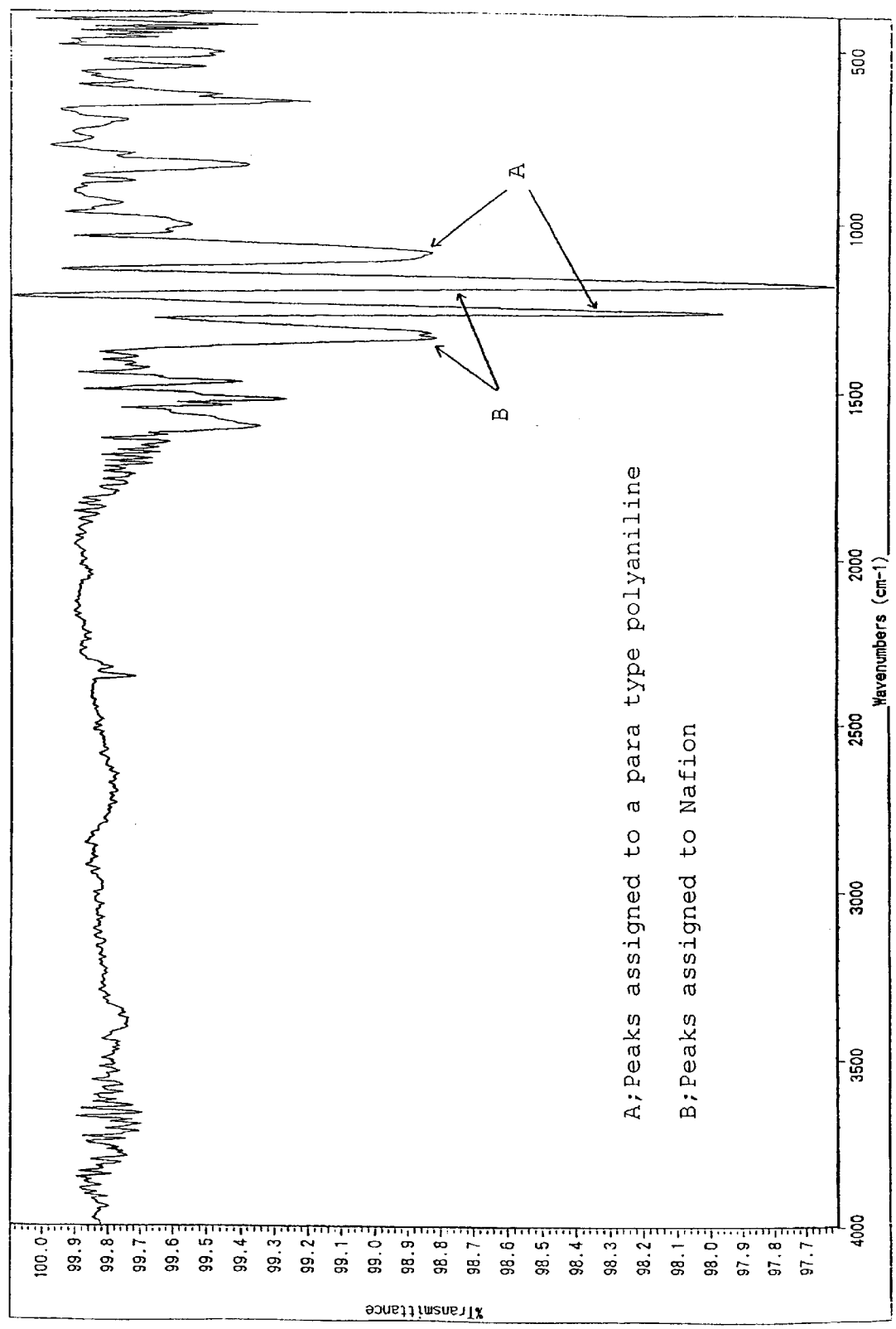
FIG. 1 is an IR chart of a composite membrane of Nafion and a polyaniline obtained in Example 12.

Usually, acidic group-containing polymers can adsorb aniline. Accordingly, composite membranes of polyaniline-containing polymer membranes and the acidic group-containing polymer membranes can be produced by allowing aniline to be adsorbed by the acidic group-containing polymer membranes, and subjecting the aniline to oxidative polymerization to obtain the polyaniline-containing polymer membranes.

The acidic groups of the acidic group-containing polymers include a sulfonic acid group and a phosphoric acid group.

The acidic group-containing polymers include water-absorptive polymers in which sulfonic acid groups are introduced into perfluorosulfonic acid polymers and aromatic polyketone polymers such as sulfonated polyether ether ketone (PEEK). The perfluorosulfonic acid polymers include Nafion 112 (trade name) and Nafion 117 (trade name) manufactured by E. I. du Pont de Nemours and Company, and Flemion (trade name) manufactured by Asahi Glass Co., Ltd.

The above-mentioned sulfonic acid group-containing water-absorptive polymers such as the perfluorosulfonic acid polymers and sulfonated PEEK express proton conductivity by hydration.

The thickness of the acidic group-containing polymer membrane (hereinafter referred to as a "Nafion membrane") used in the production of the composite membrane of the invention is preferably from 10 to 200 $\mu$m, and more preferably from 30 to 100 $\mu$m.

As to aniline, the conventional goods on the market can be used. Further, aniline derivatives each having at least one substituent on an aromatic ring may be used. The number of the substituent(s) is from 1 to 4, and preferably 1 or 2. In that case, the polyaniline produced has the substituents on the aromatic rings in repeating units.

The aniline derivatives having the substituents include toluidine, anisidine, aminobenzoic acid, aminobenzotrifluoride and phenylenediamine.

In the invention, aniline allowed to be adsorbed on the Nafion membrane in an aniline suspension is polymerized in an aqueous solution in the presence of an oxidizing agent to obtain the polyaniline-containing polymer membrane, thus producing the composite membrane. This polymerization reaction is chemical oxidative polymerization, and represented by the following reaction scheme (II):

minutes to 6 hours, preferably for about 1 hour, boiled in deionized water for 15 minutes to 6 hours, preferably for about 1 hour, boiled in a 0.1 to 5 moles/liter, preferably about 0.5 mole/liter aqueous solution of sulfuric acid for 15 minutes to 6 hours, preferably for about 1 hour, and finally boiled in deionized water for 15 minutes to 6 hours, preferably for about 1 hour. This pretreatment gives the effect of removing organic impurities and metallic ions contained in the Nafion membrane and activating the sulfonic acid groups.

After the pretreatment, the Nafion membrane is treated in deionized water or an aqueous solution of an acid to equilibrate it. The equilibration means the immersion of the membrane in deionized water or the aqueous solution of the acid. The equilibration has the effect of allowing these liquids to be absorbed into the membrane. In this case, the use of the aqueous solution of the acid having high concentration improves the acidity of the membrane, so that the amount of aniline adsorbed by the membrane in the subsequent step increases. The acids used include sulfuric acid, phosphoric acid, hydrochloric acid and nitric acid.

The concentration of an aqueous solution of sulfuric acid used is 5 moles/liter or less, and preferably from 0.01 to 1 mole/liter. Exceeding 5 moles/liter results in an increased thickness of the resulting polyaniline, which largely inhibits the proton conductivity of the composite membrane. The time required for equilibration is usually from 15 minutes to 72 hours, preferably from 1 to 48 hours, and more preferably about 24 hours. Less than 15 minutes results in insufficient equilibration, whereas exceeding 72 hours leads to a poor further progress of equilibration. The temperature of equilibration is usually from 0° C. to 100° C., and preferably room temperature. Less than 0° C. results in a decreased diffusion speed and also a fear of freezing, whereas exceeding 100° C. causes significant evaporation of water.

As an adsorption solution for allowing aniline to be adsorbed by the Nafion membrane, commercially available aniline is used as it is. An aniline suspension having a concentration of 1% by volume or more, preferably about 10% by volume is also used which is obtained by vigorously stirring aniline with deionized water to suspend it therein. The commercially available Nafion membrane is immersed in this aniline or aniline suspension for 1 second to 1 hour, preferably for about 5 minutes, thus allowing aniline to be adsorbed thereby. Aniline is adsorbed not only on the Nafion membrane, but also into the Nafion membrane in the vicinity of a surface thereof by the immersion. It is preferred that the aniline or aniline suspension is stirred during the immersion.

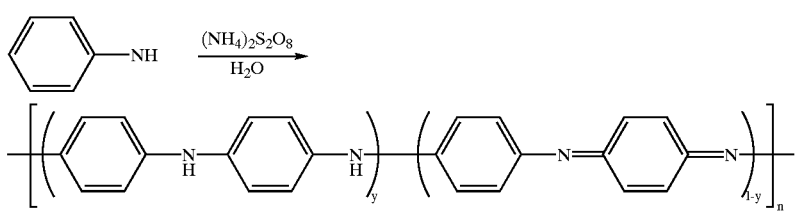

(II)

It is preferred that pretreatment is conducted to the above-mentioned Nafion membrane before adsorption of aniline in the aqueous solution of the oxidizing agent.

In the pretreatment, the Nafion membrane is washed with deionized water, boiled in a 1.0 to 10.0 wt %, preferably about 3 wt % aqueous solution of hydrogen peroxide for 15

The Nafion membrane by which aniline is allowed to be adsorbed is pulled up from the aniline or aniline suspension, and then immersed in a solution of an oxidizing agent at −25° C. to +25° C., preferably about −4° C., for 30 minutes to 12 hours, preferably about 2 hours, to polymerize aniline adsorbed.

The oxidizing agents include ammonium peroxodisulfate, iron(III) chloride, manganese dioxide and hydrogen peroxide, and preferred is ammonium peroxodisulfate.

The amount of the oxidizing agent is preferably from 1 to 20% by weight, and more preferably about 5% by weight, in the concentration of a reaction solution.

The solvents for the oxidizing agent solutions include preferably deionized water and an aqueous solution of sulfuric acid having a concentration of 5 moles/liter or less, and more preferably an aqueous solution of sulfuric acid having a concentration of 0.01 to 1 mole/liter.

When the temperature of the oxidizing agent solution is lower than −20° C., the polymerization rate of aniline is unfavorably decreased, and the solution is also likely to freeze. On the other hand, exceeding 10° C. results in no increase in the degree of polymerization. When the immersion time in the oxidizing agent solution is less than 30 minutes, the degree of polymerization of aniline does not increase. On the other hand, exceeding 12 hours results in a poor further progress of polymerization.

After the polymerization is finished, the Nafion membrane is boiled in deionized water for 15 minutes to 6 hours, preferably about 1 hour, boiled in a 0.1 to 5 moles/liter, preferably about 0.5 mole/liter aqueous solution of sulfuric acid for 15 minutes to 6 hours, preferably for about 1 hour, and finally boiled in deionized water for 15 minutes to 6 hours, preferably for about 1 hour. This after treatment gives the effect of activating the sulfonic acid groups of the Nafion membrane.

The thickness of the polyaniline-containing polymer membrane of the composite membrane obtained is preferably from 10 to 200 μm, and more preferably from 30 to 100 μm.

Although the polyaniline-containing polymer membrane of the composite membrane of the invention may be formed on one side of the composite membrane, it is preferably formed on both sides thereof as the solid polymer electrolyte membrane.

The polyaniline-containing polymer constituting the composite membrane may be a polymer comprising a polyaniline, a copolymer thereof with another monomer, or a composition thereof with another polymer.

FIG. 1 is a chart of an IR absorption spectrum of a composite membrane obtained by polymerizing aniline on a Nafion membrane. As shown in FIG. 1, the formation of a para type polyaniline is confirmed by the presence of peaks at 1,170 $cm^{-1}$ and 1,280 $cm^{-1}$ assigned to nitrogen atoms bonded to phenyl groups at the meta-positions. Peaks at 1,180 $cm^{-1}$ and 1,360 $cm^{-1}$ are assigned to the Nafion membrane.

In the polyaniline of the composite membrane of the invention, aromatic rings in repeating units thereof may have substituents.

Using as samples the composite membranes allowed to stand in deionized water at room temperature for 24 hours, the proton conductivity of the composite membranes of the invention is measured as follows.

High frequency impedance measurements are made with an impedance analyzer "YHP 4192A" manufactured by YOKOGAWA-HEWLETT PACKARD, LTD. at room temperature at 750 mV, using four terminals or two terminals. The direct current component R is read from Cole-Cole plots, and the proton conductivity can be calculated therefrom.

The composite membranes of the invention show excellent proton conductivity, similarly to previously known Nafion membranes.

The proton conducting polymers of the invention can be comprised in the solid polymer electrolyte membranes used in fuel cells, particularly in DMFCs.

The methanol barrier property of the solid polymer electrolyte membrane is measured in the following manner.

The solid polymer electrolyte membrane having an area of 9 $cm^2$ is incorporated into a fuel cell to partition the cell into an anode chamber and a cathode chamber, and the cell is sealed. Keeping the cell temperature at 70° C., a 1 M aqueous solution of methanol pressurized to 0.5 kgf/$cm^2$ is supplied into the anode chamber at 0.5 ml/minute. Dry air is allowed to flow in the cathode chamber on the opposite side through an inlet at ordinary pressure, and a membrane-permeated material is collected with a cold trap of liquid nitrogen from a gas exhausted through an outlet. The permeation amount of methanol (g/$cm^2$) is calculated from the weight of the collected material (membrane-permeated material) and the composition determined by gas chromatographic analysis, which is employed as evaluation results of methanol permeability.

The solid polymer electrolyte membranes comprising the composite membranes of the invention are excellent in methanol barrier property, compared with the Nafion membranes.

The solid polymer electrolyte membranes comprising the composite membranes of the invention are excellent in proton conductivity and methanol barrier property, so that they are very useful as solid polymer electrolyte membrane materials for fuel cells, particularly for liquid supply type DMFCs.

The present invention will be illustrated with reference to examples in more details below, but these examples are not intended to limit the scope of the present invention. Parts and percentages in the examples and comparative examples are on a weight basis, unless otherwise specified. Various evaluations were conducted as follows.

IR Absorption Spectrum

The IR absorption spectrum was measured by the reflective diffusion method, using PERKIN ELMER System 2000FT-IR.

Proton Conductivity

A composite membrane allowed to stand in deionized water at room temperature for 24 hours was used as a sample for proton conductivity measurements. High frequency impedance measurements were made with an impedance analyzer "YHP 4192A" manufactured by YOKOGAWA-HEWLETT PACKARD, LTD. at room temperature at 750 mV, using two terminals. The direct current component R was read from Cole-Cole plots, and the proton conductivity (S/cm) was calculated therefrom.

Methanol Barrier Property

A solid polymer electrolyte membrane having an area of 9 $cm^2$ was incorporated into a fuel cell to partition the cell into an anode chamber and a cathode chamber, and the cell is sealed. Keeping the cell temperature at 70° C., a 1 M aqueous solution of methanol pressurized to 0.5 kgf/$cm^2$ was supplied into the anode chamber at 0.5 ml/minute. Dry air was allowed to flow in the cathode chamber on the opposite side through an inlet at ordinary pressure, and a membrane-permeated material is collected with a cold trap of liquid nitrogen from a gas exhausted through an outlet. The permeation rate of methanol (g/$cm^2$) was calculated from the weight of the collected material and the composition determined by gas chromatographic analysis, which was employed as evaluation results of the methanol barrier property.

EXAMPLES 1 TO 3

Nafion 112 membranes manufactured by E. I. du Pont de Nemours and Company were washed with deionized water, boiled in a 3 wt % aqueous solution of hydrogen peroxide for 1 hour, boiled in deionized water for 1 hour, boiled in a 0.5 mole/liter aqueous solution of sulfuric acid for 1 hour, and finally boiled in deionized water for 1 hour, thus obtained treated membranes. The treated membranes were allowed to stand in deionized water at room temperature for 24hours. The treated membranes allowed to stand in deionized water were immersed in aniline manufactured by Aldrich Chemical Co., Inc., under conditions shown in Table 1 to allow aniline to be adsorbed thereby.

A 5 wt % aqueous solution of ammonium peroxodisulfate was kept at a temperature of −4° C. with stirring, and the Nafion membranes by which aniline was adsorbed were immersed therein to conduct polymerization of aniline.

After the polymerization was finished, the membranes were boiled in deionized water for 1 hour, boiled in a 0.5 mole/liter aqueous solution of sulfuric acid for 1 hour, and finally boiled in deionized water for 1 hour to obtain Nafion membranes (composite membranes) on the surface of which polyaniline membranes are formed. Results of evaluations for the composite membranes thus obtained are shown in Table 1.

EXAMPLES 4 TO 12

Aniline manufactured by Aldrich Chemical Co., Inc. was mixed with deionized water, and the resulting mixture was vigorously stirred to suspend it therein, thereby preparing an aniline suspension. The treated membranes obtained in the same manner as above allowed to stand in deionized water were immersed in the suspension under conditions shown in Table 1. Composite membranes were obtained in the same manner as with Example 1 with the exception that the conditions shown in Table 1 were used. Results of evaluations are shown in Table 1. An IR chart of the composite membrane prepared in Example 12 is shown in FIG. 1.

Comparative Example 1

A single membrane of Nafion 112 manufactured by E. I. du Pont de Nemours and Company was evaluated. Results thereof are shown in Table 1.

Comparative Example 2

A single membrane of Nafion 117 manufactured by E. I. du Pont de Nemours and Company was evaluated. Results thereof are shown in Table 1.

TABLE 1

| | | Equilibration Concentration of Sulfuric Acid Solution (M) | Conditions of Adsorption | | Polymerization | Composite Membrane | |
| --- | --- | --- | --- | --- | --- | --- | --- |
| | Base Membrane (Nafion) | | Concentration of Suspension (vol %) | Adsorption Time (min) | Concentration of Sulfuric Acid Solution (M) | Proton Conductivity (S/cm) | Permeation Rate of Methanol (g/min·cm$^2$) |
| Example 1 | 112 | 0 | 100 | 5 | 0 | $1.5 \times 10^{-2}$ | — |
| Example 2 | 112 | 0 | 100 | 15 | 0 | $1.3 \times 10^{-2}$ | — |
| Example 3 | 112 | 0 | 100 | 120 | 0 | $1.0 \times 10^{-2}$ | — |
| Example 4 | 112 | 0 | 20 | 5 | 0 | $1.6 \times 10^{-2}$ | — |
| Example 5 | 112 | 0 | 20 | 15 | 0 | $1.3 \times 10^{-2}$ | — |
| Example 6 | 112 | 0 | 10 | 1 | 0 | $1.5 \times 10^{-2}$ | — |
| Example 7 | 112 | 0 | 10 | 5 | 0 | $1.6 \times 10^{-2}$ | $7.8 \times 10^{-4}$ |
| Example 8 | 112 | 0 | 10 | 15 | 0 | $1.2 \times 10^{-2}$ | — |
| Example 9 | 112 | 0.1 | 10 | 5 | 0.1 | $1.2 \times 10^{-2}$ | $7.7 \times 10^{-4}$ |
| Example 10 | 112 | 0.5 | 10 | 5 | 0.5 | $7.4 \times 10^{-3}$ | $3.5 \times 10^{-4}$ |
| Example 11 | 117 | 0 | 10 | 15 | 0 | $3.3 \times 10^{-2}$ | $1.4 \times 10^{-4}$ |
| Example 12 | 117 | 0 | 10 | 120 | 0 | $9.3 \times 10^{-3}$ | $7.4 \times 10^{-5}$ |
| Comparative Example 1 | 112 | — | — | — | — | $1.2 \times 10^{-2}$ | $1.7 \times 10^{-3}$ |
| Comparative Example 2 | 117 | — | — | — | — | $1.8 \times 10^{-2}$ | $1.2 \times 10^{-3}$ |

From the results of Table 1, it is apparent that the composite membranes of the invention have excellent proton conductivity, similarly to the conventional Nafion single membranes, and smaller in the permeation rate of methanol than the Nafion membranes, which shows the excellent methanol barrier property.

The degree of coating of the polyaniline on the Nafion membrane can be controlled by the adsorption time of aniline on the Nafion membrane and the concentration of the aqueous solution of the acid used in equilibration. In particular, when the concentration of the aqueous solution of the acid used in equilibration is high, the thickness of the polyaniline membrane and the concentration of the polyaniline contained in the composite membrane increase to improve the methanol barrier property.

Aniline is allowed to be adsorbed by the acidic group-containing polymers, and subjected to oxidative polymerization to form the polyaniline-containing polymer membranes, thereby producing the composite membranes. Thus, the solid polymer electrolyte membranes excellent in proton conductivity and methanol barrier property are obtained, which are useful as solid polymer electrolyte membranes for fuel cells, particularly for DMFCs. Further, in the production of the composite membrane, the amount of the polyaniline contained in the composite membrane can be increased by treating the acidic group-containing polymer in the aqueous solution of the acid before the adsorption of aniline to equilibrate it.

What is claimed is:

1. A proton conducting composite polymer membrane in which a polyaniline-containing polymer membrane is formed on a surface of an acidic group-containing polymer membrane wherein the polymers are hydrated and the acidic group of the acidic group-containing polymer is activated.

2. The composite membrane according to claim 1, wherein aromatic rings in repeating units of the polyaniline have substituents.

3. The composite membrane according to claim 1, wherein the acidic group-containing polymer is a sulfonic acid group-containing water absorptive polymer.

4. The composite membrane according to claim 1, wherein the acidic group-containing polymer is a perfluorosulfonic acid polymer.

5. A method for producing the composite membrane according to claim 1, which comprises allowing aniline to be adsorbed by an acidic group-containing polymer membrane, and subjecting the aniline to oxidative polymerization to obtain a polyaniline-containing polymer membrane.

6. The method according to claim 5, wherein the acidic group-containing polymer membrane is subjected to equilibration treatment in deionized water or an aqueous solution of an acid before the adsorption of aniline to allow an acid to be contained in the polymer membrane.

7. The method according to claim 6, wherein the thickness of the polyaniline-containing polymer membrane and the concentration of the polyaniline contained in the composite membrane are increased by increasing the concentration of the aqueous solution of the acid.

8. A solid polymer electrolyte membrane comprising the composite membrane according to claim 1.

9. The composite membrane according to claim 2, aromatic rings in repeating units of the polyaniline have from 1 to 4 substituents.

10. The composite membrane according to claim 2, aromatic rings in repeating units of the polyaniline have from 1 to 2 substituents.

11. The composite membrane according to claim 1, wherein the polyaniline is a polyaniline derivative selected from the group consisting of toluidine, anisidine, aminobenzoic acid, aminobenzotrifluoride and phenylenediamine.

12. The composite membrane according to claim 1, wherein the thickness of the acidic group-containing polymer membrane is from 10 to 200 $\mu$m.

13. The composite membrane according to claim 1, wherein the thickness of the acidic group-containing polymer membrane is from 30 to 100 $\mu$m.

14. The method according to claim 5, wherein adsorption of the aniline is conducted in the presence of an oxidizing agent.

15. The method according to claim 14, wherein the oxidizing agent is selected from the group consisting of ammonium peroxodisulfate, iron(III) chloride, manganese dioxide, and hydrogen peroxide.

16. The method according to claim 14, wherein the oxidizing agent is ammonium peroxodisulfate.

17. The method according to claim 5, further comprising pretreating the acidic group-containing polymer membrane prior to adsorption of the aniline by the acidic group-containing polymer membrane.

18. The method according to claim 17, wherein the acidic group-containing polymer membrane is pretreated by washing in deionized water, boiling in aqueous hydrogen peroxide, boiling in deionized water, boiled in aqueous sulfuric acid, and boiling in deionized water.

19. The method according to claim 6, wherein the acid in the aqueous solution is selected from the group consisting of sulfuric acid, phosphoric acid, hydrochloric acid, and nitric acid.

20. The method according to claim 6, wherein the concentration of the acid in the aqueous solution is 5 moles/liter or less.

21. The method of claim 20, wherein the concentration of the acid in the aqueous solution is 0.01 to 1 mole/liter.

22. The method of claim 6, wherein the acidic group-containing polymer membrane is subjected to equilibration treatment for a period of from 15 minutes to 72 hours.

23. The method of claim 6, wherein the acidic group-containing polymer membrane is subjected to equilibration treatment for a period of from 1 to 48 hours.

24. The method of claim 6, wherein the acidic group-containing polymer membrane is subjected to equilibration treatment at a temperature of from 0° C. to 100° C.

25. A proton conducting composite polymer membrane as claimed in claim 1 having been produced by a method which comprises allowing aniline to be adsorbed by an acidic group-containing polymer membrane, and subjecting the aniline to oxidative polymerization to obtain a polyaniline-containing polymer membrane.

* * * * *